US012250437B2

United States Patent
Keith et al.

(10) Patent No.: US 12,250,437 B2
(45) Date of Patent: Mar. 11, 2025

(54) COLOR NIGHT VISION SYSTEM AND METHOD

(71) Applicant: Rockwell Collins, Inc., Cedar Rapids, IA (US)

(72) Inventors: Christopher A. Keith, Wilsonville, OR (US); Michael A. Ropers, Cedar Rapids, IA (US); Christopher Buchholz, Wilsonville, OR (US); Bobby D. Foote, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 17/201,328

(22) Filed: Mar. 15, 2021

(65) Prior Publication Data

US 2021/0314500 A1    Oct. 7, 2021

Related U.S. Application Data

(60) Provisional application No. 63/004,658, filed on Apr. 3, 2020.

(51) Int. Cl.
*H04N 23/11* (2023.01)
*H04N 23/80* (2023.01)
(Continued)

(52) U.S. Cl.
CPC ............ *H04N 23/11* (2023.01); *H04N 23/80* (2023.01); *H04N 25/131* (2023.01); *H04N 25/135* (2023.01)

(58) Field of Classification Search
CPC .............. H04N 5/332; H04N 5/23229; H04N 9/04553; H04N 9/04559; H04N 23/11; H04N 23/80; H04N 25/131; H04N 25/135
(Continued)

(56) References Cited

U.S. PATENT DOCUMENTS 5,214,503 A    5/1993  Chiu et al.
H1599 H    10/1996  Task et al.
(Continued)

FOREIGN PATENT DOCUMENTS

CN    106375742 A    2/2017

OTHER PUBLICATIONS

EP Search Report for European Application No. 21166572.4 dated Sep. 3, 2021, 7 pages.
(Continued)

*Primary Examiner* — Joseph G Ustaris
*Assistant Examiner* — Jimmy S Lee
(74) *Attorney, Agent, or Firm* — Suiter Swantz IP

(57) ABSTRACT

A system may include a processor, a night vision sensor, and an objective lens assembly comprising four lenses. Each of a first lens, a second lens, a third lens, and a fourth lens may be configured to project a real world scene onto one of four portions of the night vision sensor. The night vision sensor may be configured to provide four images of the real world scene from the objective lens assembly to the processor. The processor may be configured to: receive a first image, a second image, a third image, and a fourth image from the night vision sensor; generate color night vision image data based at least on the first image, the second image, the third image, and the fourth image; and output the color night vision image data.

18 Claims, 2 Drawing Sheets

(51) Int. Cl.
  *H04N 25/13* (2023.01)
  *H04N 25/131* (2023.01)
(58) Field of Classification Search
  USPC .......................................................... 348/164
  See application file for complete search history.

(56) References Cited

U.S. PATENT DOCUMENTS

| | | | |
|---|---|---|---|
| 5,756,989 A | 5/1998 | Bear et al. | |
| 6,570,147 B2 | 5/2003 | Smith | |
| 6,859,229 B1* | 2/2005 | Suda | H04N 23/843 |
| | | | 348/273 |
| 7,795,577 B2 | 9/2010 | Olsen et al. | |
| 7,969,462 B2* | 6/2011 | Ostromek | G06T 5/50 |
| | | | 382/284 |
| 8,810,651 B2* | 8/2014 | Calnegru | H04N 23/11 |
| | | | 348/34 |
| 8,836,793 B1* | 9/2014 | Kriesel | H04N 23/11 |
| | | | 348/164 |
| 9,380,273 B1 | 6/2016 | Jensen et al. | |
| 9,894,337 B2 | 2/2018 | Keesling et al. | |
| 10,067,400 B1 | 9/2018 | Foote et al. | |
| 2002/0030163 A1* | 3/2002 | Zhang | G02B 27/1066 |
| | | | 348/E5.09 |
| 2010/0194901 A1* | 8/2010 | van Hoorebeke | G02B 3/0068 |
| | | | 348/E5.024 |
| 2012/0075514 A1 | 3/2012 | Liu et al. | |
| 2013/0222652 A1* | 8/2013 | Akeley | H04N 25/134 |
| | | | 348/241 |
| 2014/0327837 A1* | 11/2014 | Osterman | H04N 23/10 |
| | | | 349/2 |
| 2015/0103257 A1* | 4/2015 | Nakashin | H04N 9/3194 |
| | | | 348/746 |
| 2017/0070715 A1* | 3/2017 | Keesling | H04N 23/6812 |
| 2018/0109739 A1* | 4/2018 | Foley | G03B 17/02 |
| 2018/0366507 A1* | 12/2018 | Mlinar | H01L 27/14649 |
| 2019/0387150 A1* | 12/2019 | Iwakura | H04N 23/45 |
| 2021/0297607 A1* | 9/2021 | Wang | H04N 23/843 |

OTHER PUBLICATIONS

Extended European Search Report dated Apr. 28, 2023; European Application No. 21166572.4.

* cited by examiner

COLOR NIGHT VISION SYSTEM AND METHOD

CROSS-REFERENCE TO RELATED APPLICATIONS

The present application is related to and claims priority from: U.S. Application Ser. No. 63/004,658, titled COLOR NIGHT VISION SYSTEM AND METHOD, filed Apr. 3, 2020. U.S. Application Ser. No. 63/004,658 is herein incorporated by reference in its entirety.

BACKGROUND

Color night vision has been identified as desirable to allow for better discrimination of night scenes. Color night vision would allow a user to not only see objects, but also the color of the object.

Existing color night vision approaches use more traditional types of cameras designed to work at low light levels. These cameras have large lenses to collect enough light, and such cameras have low sensitivity under low light conditions. Such color night vision approaches are not suitable for head worn applications. Other approaches for color night vision rely on false color approaches that do not correctly represent the true color of a scene, and typically require multiple sensors to be correctly implemented.

Digital night vision provides users with a capability beyond current analog night vision systems. Digital night vision system video output can be processed and enhanced to improve visual acuity and improve situational awareness in degraded environments.

The issue with color night vision is that existing approaches increase the number of sensors, increase helmet weight, and greatly increase cost. Commercial color night cameras are currently too large for many applications. The addition of color filters to pixelated night vision sensors that are small and have high sensitivity under low light conditions is currently expensive.

SUMMARY

In one aspect, embodiments of the inventive concepts disclosed herein are directed to a system. The system may include a processor, a night vision sensor communicatively coupled to the processor, and an objective lens assembly comprising four lenses. The four lenses may include a first lens, a second lens, a third lens, and a fourth lens. The first lens may be configured to project a real world scene onto a first portion of the night vision sensor. The second lens may be configured to project the real world scene onto a second portion of the night vision sensor. The third lens may be configured to project the real world scene onto a third portion of the night vision sensor. The fourth lens may be configured to project the real world scene onto a fourth portion of the night vision sensor. The night vision sensor may be configured to provide at least four images of the real world scene from the objective lens assembly to the processor, the at least four images including a first image, a second image, a third image, and a fourth image. The processor may be configured to: receive the first image, the second image, the third image, and the fourth image from the night vision sensor; generate color night vision image data based at least on the first image, the second image, the third image, and the fourth image; and output the color night vision image data.

In a further aspect, embodiments of the inventive concepts disclosed herein are directed to a method. The method may include: projecting, by a first lens of an objective lens assembly, a real world scene onto a first portion of a night vision sensor, the objective lens assembly comprising four lenses; projecting, by a second lens of the objective lens assembly, the real world scene onto a second portion of the night vision sensor; projecting, by a third lens of the objective lens assembly, the real world scene onto a third portion of the night vision sensor; projecting, by a fourth lens of the objective lens assembly, the real world scene onto a fourth portion of the night vision sensor; providing, by the night vision sensor, at least four images of the real world scene from the objective lens assembly to the processor, the at least four images including a first image, a second image, a third image, and a fourth image, the night vision sensor communicatively coupled to the processor; receiving, by the processor, the first image, the second image, the third image, and the fourth image from the night vision sensor; generating, by the processor, color night vision image data based at least on the first image, the second image, the third image, and the fourth image; and outputting, by the processor, the color night vision image data.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
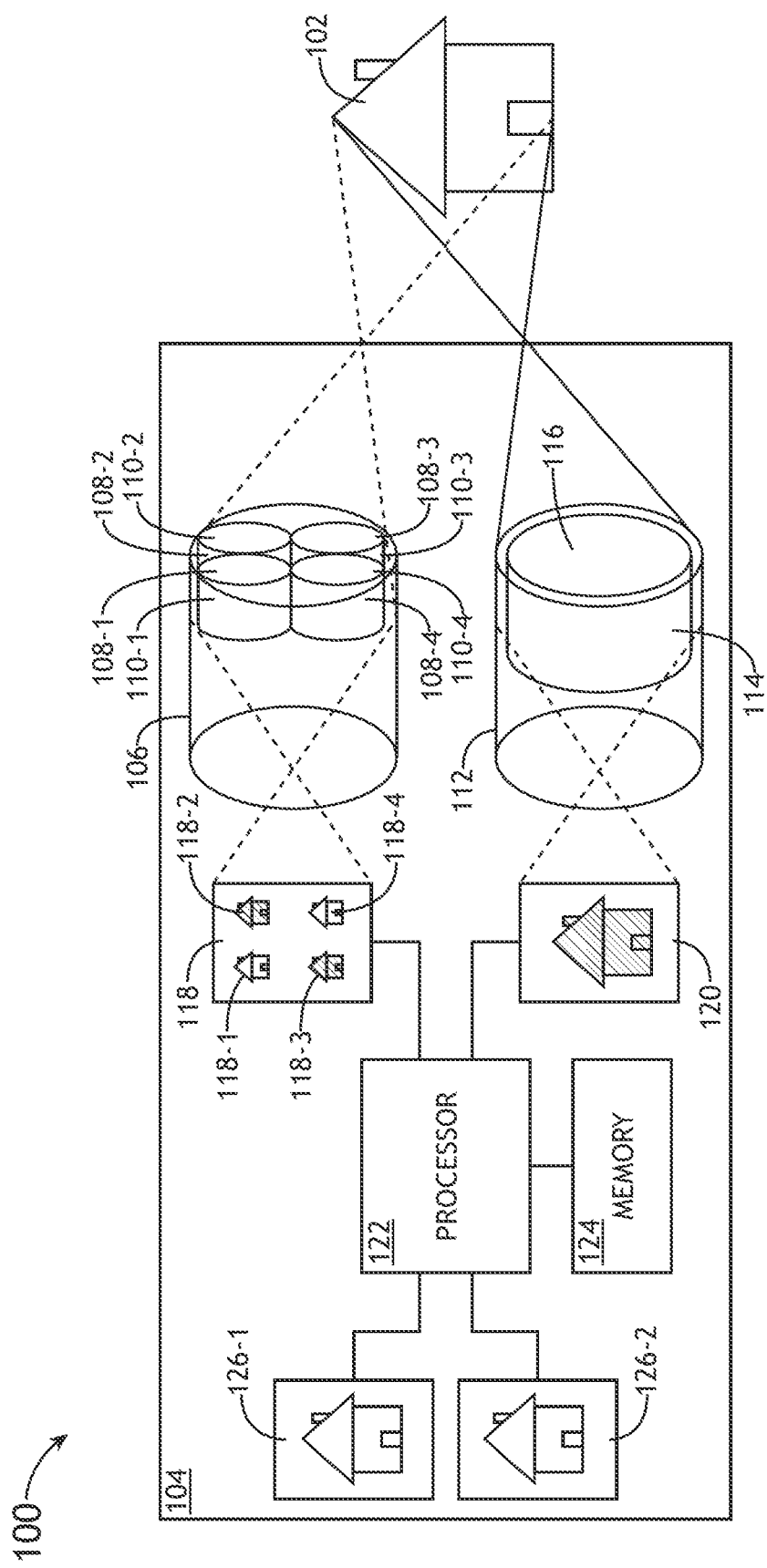
FIG. 1 is a view of an exemplary embodiment of a system including a night vision device according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a method and a color night vision system.

Some embodiments may include an objective lens assembly comprising four smaller lenses, each designed to project a real world scene to one quarter of a digital night vision sensor that may have high sensitivity under low light conditions. In some embodiments, each of the lenses may have a color filter in the visible spectrum; in some embodiments, one or more of the lenses may have an infrared (IR) filter (e.g., a short-wave infrared (SWIR) and/or near infrared (NIR) filter). For example, one of the four lenses may have a red filter, another may be green, a third may be blue, and the fourth may be unfiltered or also be blue. The four quadrants may be stacked and processed to create a night vision true color video that can be displayed to a user. The system can be combined with an unfiltered standard channel to achieve a higher resolution and provide more detail in the image. This approach can produce true color down to low ambient light levels (e.g., down to quarter moon or less).

In some embodiments, an objective lens assembly can provide full true night vision color that does not increase head borne weight, does not require an additional sensor, and/or does not significantly increase production cost. The color night objective lens assembly may include four smaller lenses, each of which is designed to project a real world scene to a portion (e.g., a quarter) of a digital night vision sensor that may have high sensitivity under low light conditions. Some or all of the lenses may have a color filter in the visible spectrum.

Some embodiments have the advantage of using night vision sensor(s) that have high sensitivity under low light conditions that can help overcome a slower lens design. Processing may further improve the night color, such as by using gamma and gain corrections. Some embodiments may allow a user to use the system at very low light levels in monochrome. Some embodiments may use visible color filters and/or NIR and/or SWIR filters to provide spectral data for creating false color and/or pseudo-color when not enough visible light is available at very low light ambient conditions.

Some embodiments may include true color night vision that can be created by separating red, green, and blue collected light from a night scene and by projecting these images onto different areas of a night vision sensor. These images can be combined through processing and displayed in color.

In some embodiments, the system can include two or more filters to gather more spectral data for true and false night vision color displays.

In some embodiments, the system can include filtering outside the visible color spectrum to provide additional data and information as assigned false color to the user.

In some embodiments, multiple similar color filter bands, which may be uniquely separated, can be used to provide hyperspectral capability.

Referring now to FIG. 1, an exemplary embodiment of a system 100 according to the inventive concepts disclosed herein is depicted. The system 100 may be implemented as any suitable system, such as a vehicle (e.g., an aircraft (e.g., an airplane and/or helicopter), a watercraft, a submersible craft, an automobile, or a train), a wearable system, a building, an environment, a battle field, and/or a work station. For example, as shown in FIG. 1, the system 100 may include a night vision device 104 (e.g., a head wearable device (e.g., a helmet-mounted display (HMD) or a near-eye display) and/or a night vision camera, such as a surveillance night vision camera) configured to capture and display color night vision images and/or video of a real world scene 102; while some embodiments may include the night vision device 104, other embodiments may include a system having one or more elements of the night vision device 104 implemented in another device or in another system. In some embodiments, the night vision device 104 may include at least one first objective lens assembly 106, at least one second objective lens assembly 112, at least one first night vision sensor 118, at least one second night vision sensor 120, at least one processor 122, at least one memory 124, and/or at least one display 126-1, 126-2, some or all of which may be communicatively and/or optically coupled at any given time.

In some embodiments, the first objective lens assembly 106 may be a full color night vision objective lens assembly. The first objective lens assembly 106 may include a plurality (e.g., four or more) of lenses (e.g., 108-1, 108-2, 108-3, and/or 108-4). For example, some of or all the plurality of lenses (e.g., 108-1, 108-2, 108-3, and/or 108-4) may be discrete lenses, and/or or some or all of the plurality may be part of a multi-lens array. For example, the objective lens assembly 106 may include a first lens 108-1, a second lens 108-2, a third lens 108-3, and a fourth lens 108-4. The first lens 108-1 may be configured to project a real world scene 102 onto a first portion 118-1 of the first night vision sensor 118. The second lens 108-2 may be configured to project the real world scene 102 onto a second portion 118-2 of the first night vision sensor 118. The third lens 108-3 may be configured to project the real world scene 102 onto a third portion 118-3 of the first night vision sensor 118. The fourth lens 108-4 may be configured to project the real world scene 102 onto a fourth portion 118-4 of the first night vision sensor 118. In some embodiments, the first objective lens assembly 106 may have multiple imaging channels (e.g., four imaging channels), each of which may be an optics path from the real world to a sensor imaging plane, and each imaging channel may include a lens (e.g., 108-1, 108-2, 108-3, or 108-4). In some embodiments, each imaging channel may include multiple lenses. In some embodiments, the first objective lens assembly 106 may further include a common lens that projects an image onto each of the plurality of lenses (e.g., 108-1, 108-2, 108-3, and/or 108-4).

In some embodiments, each of one, some, or all of the lenses (e.g., 108-1, 108-2, 108-3, and/or 108-4) may have a filter (e.g., 110-1, 110-2, 110-3, 110-4; e.g., a visible color light filter and/or an infrared (IR) (e.g., NIR and/or SWIR) filter). For example, the first lens 108-1 may have a red filter, the second lens 108-2 may have a green filter, the third lens 108-3 may have a blue filter, and the fourth lens 108-4 may have one of: no filter; a red, green, or blue filter; or an IR filter. For example, the first lens 108-1 may have one of a red, green, or blue first filter; the second lens 108-2 may have one of a red, green, or blue second filter, wherein a color of the second filter may be different from the first filter; and one or both of the third lens 108-3 and the fourth lens 108-4 may have an infrared filter.

The first night vision sensor 118 may be configured to provide multiple (e.g., at least four) images of the real world scene 102 from the first objective lens assembly 106 to the at least one processor 122. For example, the first night vision sensor 118 may have multiple (e.g., at least four) portions 118-1, 118-2, 118-3, 118-4, each configured to capture an image of the real world scene from one of the lenses 108-1, 108-2, 108-3, 108-4. For example, the four portions 118-1, 118-2, 118-3, 118-4 may be four tangentially touching circles inscribed within a larger circular sensor area. For example, the first night vision sensor 118 may output multiple (e.g., at least four) images, each image being an image of the real world scene 102 captured on one portion 118-1, 118-2, 118-3, or 118-4 of the first night vision sensor 118.

In some embodiments, the second objective lens assembly 112 may be a standard night vision objective lens assembly. The second objective lens assembly 112 may include a lens 114. In some embodiments, the lens 114 may have a filter 116 (e.g., an infrared filter, such as a NIR or SWIR filter) or may be unfiltered. The lens 114 may be configured to project the real world scene 102 onto the second night vision sensor 120.

The second night vision sensor 120 may be configured to provide at least one image of the real world scene 102 from the second objective lens assembly 112 to the at least one processor 122.

The at least one processor 122 may be configured to process data received from the first night vision sensor 118 and/or the second night vision sensor 120 and to output processed data (e.g., color night vision image data) to one or more devices (e.g., the at least one display 126-1, 126-2) or systems of the night vision device 104 and/or the system 100. The processor 122 may be configured to run various software applications or computer code stored (e.g., maintained) in a non-transitory computer-readable medium (e.g., memory 124) and configured to execute various instructions or operations. The processor 122 may be implemented as a special purpose processor configured to execute instructions for performing (e.g., collectively performing if more than one processor) any or all of the operations disclosed throughout. For example, the processor 122 may be configured to: receive a first image, a second image, a third image, and a fourth image from the first night vision sensor 118; generate color night vision image data based at least on the first image, the second image, the third image, and the fourth image; and/or output the color night vision image data (e.g., to one or more of the displays 126-1, 126-2 or another device). In some embodiments, the color night vision image data may include true color night vision image data, false color night vision image data, and/or pseudo-true-color night vision image data.

In some embodiments including the second night vision sensor 120 and the second objective lens assembly 112, the processor 122 may be further configured to: receive an image from the second night vision sensor 120; and generate the color night vision image data based at least on the first image, the second image, the third image, and the fourth image from the first night vision sensor 118 and the image from the second night vision sensor 120. For example, color image data from the four images from the first night vision sensor 118 and luminance data from a higher resolution grayscale image from the second night vision sensor 120 may be used to colorize the higher resolution grayscale image. Additionally, the processor 122 may be further configured to perform upscaling and distortion correction operations, as part of generating the color night vision image data.

In some embodiments, the processor 122 being configured to generate the color night vision image data based at least on the first image, the second image, the third image, and the fourth image f further comprises the processor being further configured to: adjust at least one of a brightness or a contrast of at least one of the first image, the second image, the third image, or the fourth image; perform a gamma correction on at least one of the first image, the second image, the third image, or the fourth image; merge at least the first image, the second image, the third image, and the fourth image into a composite image; and/or generate the color night vision image data based at least on the composite image. Gamma correction is an operation well known in the art.

In some embodiments, at least one of the first lens 108-1, the second lens 108-2, the third lens 108-3, and fourth lens 108-4 may have an infrared filter, and each of at least two of the first lens 108-1, the second lens 108-2, the third lens 108-3, and fourth lens 108-4 may have a visible color filter. In such embodiments, the processor 122 being configured to generate the color night vision image data based at least on the first image, the second image, the third image, and the fourth image further comprises the processor being further configured to: adjust at least one of a brightness or a contrast of at least one of the first image, the second image, the third image, or the fourth image; for each of the first image, the second image, the third image, and the fourth image that is a color image, boost each color image on a pixel by pixel basis based at least on nearest neighbor pixel data from at least one of the first image, the second image, the third image, and the fourth image that is an infrared-filter-formed image; extract infrared pixels with no nearest neighbor color pixels; perform a gamma correction on each color image; merge at least the first image, the second image, the third image, and the fourth image into a composite image; and/or generate the color night vision image data based at least on the composite image.

In some embodiments, each of the first image, the second image, the third image, and the fourth image may be opto-mechanically misaligned by a half-pixel from another of the first image, the second image, the third image, and the fourth image, for example, to allow for super resolution techniques to be applied when combining the first, second, etc. images into a composite color image. In such embodiments, the processor 122 being configured to generate the color night vision image data based at least on the first image, the second image, the third image, and the fourth image further comprises the processor being further configured to: adjust at least one of a brightness or a contrast of at least one of the first image, the second image, the third image, or the fourth image; perform a gamma correction on at least one of the first image, the second image, the third image, or the fourth image; perform an image comparison on the first image, the second image, the third image, and the fourth image by using super-resolution techniques to boost native resolution of each of the first image, the second image, the third image, and the fourth image; merge at least the first image, the second image, the third image, and the fourth image into a composite image; and/or generate the color night vision image data based at least on the composite image. Performance of super-resolution techniques are well known in the art.

In some embodiments, at least one of the first lens 108-1, the second lens 108-2, the third lens 108-3, and fourth lens 108-4 may have an infrared filter, and each of at least two of the first lens 108-1, the second lens 108-2, the third lens 108-3, and fourth lens 108-4 may have a visible color filter. Additionally, each of the first image, the second image, the third image, and the fourth image may be opto-mechanically misaligned by a half-pixel from another of the first image, the second image, the third image, and the fourth image. In such embodiments, the processor 122 being configured to generate the color night vision image data based at least on the first image, the second image, the third image, and the fourth image further comprises the processor being further configured to: adjust at least one of a brightness or a contrast of at least one of the first image, the second image, the third image, or the fourth image; for each of the first image, the second image, the third image, and the fourth image that is a color image, boost each color image on a pixel by pixel basis based at least on nearest neighbor pixel data from at least one of the first image, the second image, the third image, and the fourth image that is an infrared-filter-formed image; perform a gamma correction on each color image; perform an image comparison on the first image, the second image, the third image, and the fourth image by using super-resolution techniques to boost native resolution of each of the first image, the second image, the third image, and the fourth image; merge at least the first image, the second image, the third image, and the fourth image into a composite image; and/or generate the color night vision image data based at least on the composite image.

In some embodiments, the processor 122 may be configured to: acquire four images (e.g., red green blue blue (RGBB), RGB-NIR, or any other combination of red, green, blue, NIR, SWIR, or unfiltererd). The processor 122 may be configured to: adjust brightness and contrast of each image by using a histogram equalization method (histogram equalization is well known in the art). There may be a relative weighting factor across the images to maintain good white balance in the final composite image. In some cases, an NIR channel can be used to weight histogram equalization in a red, green, and/or blue image(s) according to content in an NIR image. The processor 122 may be configured to: perform a gamma correction to each image. The processor 122 may be configured to: reconstruct a single color low light image from the four images. The processor 122 may be configured to: perform a final color histogram equalization and gamma correction on a composite image (e.g., a combined color low light image).

In some embodiments, the night vision device 104 may not be configured for super resolution. In one of such embodiments with an RGBB configuration, the dual blue bands may be processed together to reduce noise in the blue image. Since these two blue images may be two independent images, the noise in each blue image may be independent, while the real world scene 102 content is the same. A simple average of the two blue frames may provide a sqrt(2) improvement in signal to noise ratio (SNR). A final color image may then be formed by taking the individual red and green images and a new combined blue image and using that data as the RGB images in a true color image. Since each image may be one quarter of the size of the total night vision sensor 118, an upscale step may be necessary to increase width and height both by a factor of 2. This upscale may use a standard resolution upscale algorithm, such as a bicubic spline technique (this technique is well known in the art). In some embodiments, any color band may be similarly doubled to improve SNR in that color band, such as RRGB, RGGB, NIR-NIR-GB, etc.

In some embodiments, the night vision device 104 may not be configured for super resolution. In one of such embodiments having an RGB-NIR configuration, the NIR image may be used to weight a histogram equalization of color bands as mentioned above.

In some embodiments, the night vision device 104 may be configured for super resolution. In such embodiments, each image from the four images may be spatially opto-mechanically misaligned by ½ a pixel. For example, the night vision device 104 may be have two red bands (or two green bands), one green band (or one red band), and one blue band. The band with a best sensitivity under low light conditions may be doubled. For example, the two red bands may be merged using spatial super resolution techniques to create a new red image that matches the size of the original night vision sensor 118, but has improved SNR over the simple upscaling described above. Super resolution is a common technique well known in the art. Some embodiments may include opto-mechanically inserting a ½ pixel misalignment and using that misalignment in a true color low light imaging application. A true color image may be formed by upscaling of blue and green bands (or whichever 2 bands were not doubled) to native sensor resolution, and combining blue and green bands with the super resolution red. This may be done with any combination of RRGB, RGGB, RGBB, GB-NIR-NIR, or etc., where the doubled band may be used to form a super resolution image prior to combining with the other two bands to make a true color image. In some embodiments, the night vision device 104 may be configured for super resolution with four distinct bands (e.g., RGB-NIR).

In some embodiments, the processor 122 being configured to generate the color night vision image data based at least on the first image, the second image, the third image, and the fourth image further comprises the processor being further configured to: perform final image processing operation(s) on the composite image. Exemplary final image processing operations may include edge enhancement (e.g., an unsharp mask) (which is well known in the art) and/or noise reduction (which is well known in the art).

Each of the displays 126-1, 126-2 may be configured to receive the color night vision image data from the processor 122 and to display color night vision images to a user. In some embodiments, the displays 126-1, 126-2 may be configured to display stereoscopic color night vision images to a user, such as in embodiments including a head wearable device (e.g., an HMD).

Figure 2:
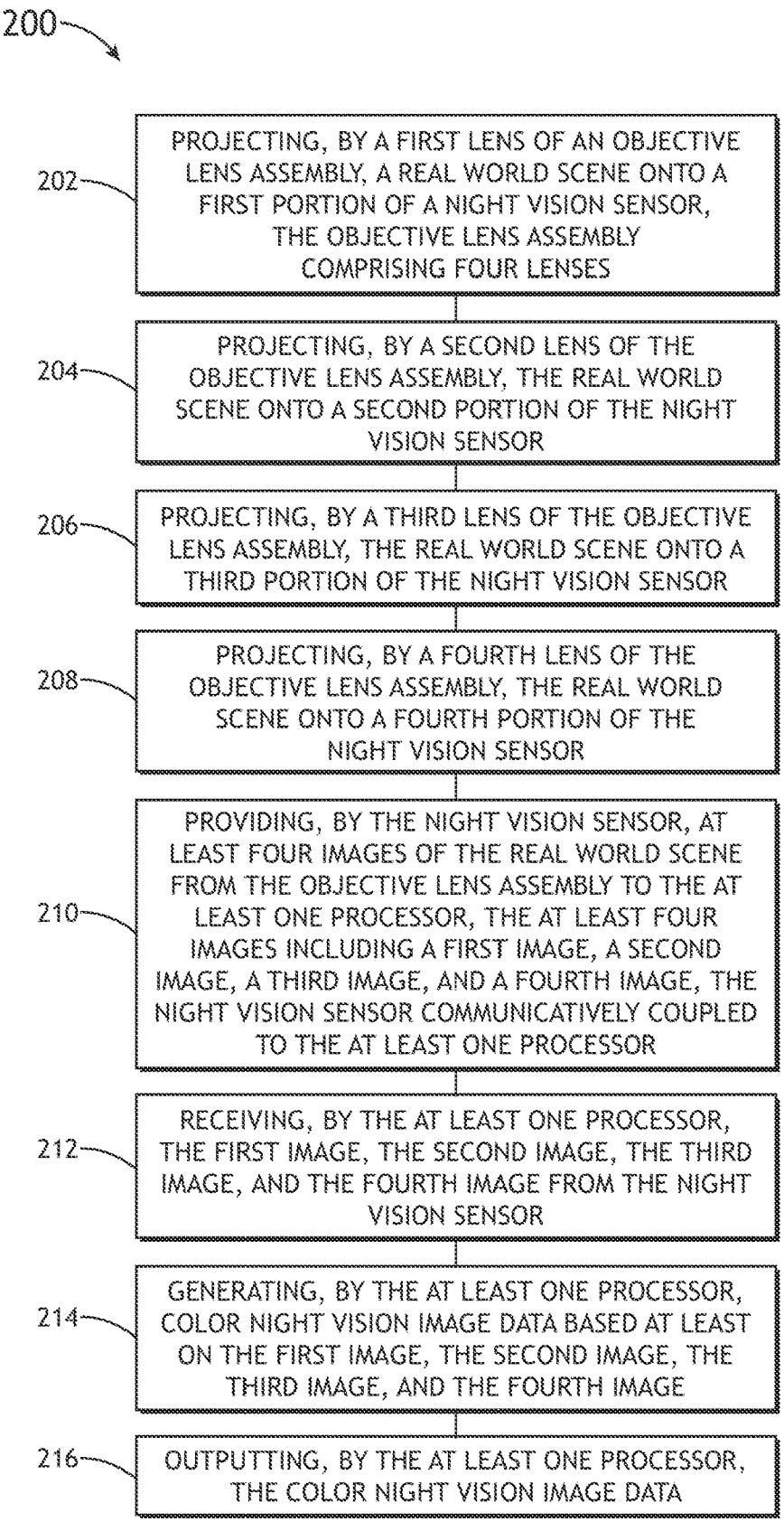
FIG. 2 is a diagram of an exemplary embodiment of a method according to the inventive concepts disclosed herein.

Referring now to FIG. 2, an exemplary embodiment of a method 200 according to the inventive concepts disclosed herein may include one or more of the following steps. Additionally, for example, some embodiments may include performing one or more instances of the method 200 iteratively, concurrently, and/or sequentially. Additionally, for example, at least some of the steps of the method 200 may be performed in parallel and/or concurrently. Additionally, in some embodiments, at least some of the steps of the method 200 may be performed non-sequentially.

A step 202 may include projecting, by a first lens of an objective lens assembly, a real world scene onto a first portion of a night vision sensor, the objective lens assembly comprising four lenses.

A step 204 may include projecting, by a second lens of the objective lens assembly, the real world scene onto a second portion of the night vision sensor.

A step 206 may include projecting, by a third lens of the objective lens assembly, the real world scene onto a third portion of the night vision sensor.

A step 208 may include projecting, by a fourth lens of the objective lens assembly, the real world scene onto a fourth portion of the night vision sensor.

A step 210 may include providing, by the night vision sensor, at least four images of the real world scene from the objective lens assembly to the at least one processor, the at least four images including a first image, a second image, a third image, and a fourth image, the night vision sensor communicatively coupled to the at least one processor.

A step 212 may include receiving, by the at least one processor, the first image, the second image, the third image, and the fourth image from the night vision sensor.

A step 214 may include generating, by the at least one processor, color night vision image data based at least on the first image, the second image, the third image, and the fourth image.

A step 216 may include outputting, by the at least one processor, the color night vision image data.

Further, the method 200 may include any of the operations disclosed throughout.

As will be appreciated from the above, embodiments of the inventive concepts disclosed herein may be directed to a method and a color night vision system.

As used throughout and as would be appreciated by those skilled in the art, "at least one non-transitory computer-readable medium" may refer to as at least one non-transitory computer-readable medium (e.g., e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof).

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
  a head wearable device, comprising:
    at least one display;
    at least one processor;
    a night vision sensor communicatively coupled to the at least one processor, wherein the night vision sensor has a sensor area;
    an objective lens assembly comprising four lenses, the four lenses comprising a first lens, a second lens, a third lens, and a fourth lens, the first lens configured to project a first color image of a real world scene onto a first portion of the night vision sensor, the second lens configured to project a second color image of the real world scene onto a second portion of the night vision sensor, the third lens configured to project a third image of the real world scene onto a third portion of the night vision sensor, the fourth lens configured to project a fourth image of the real world scene onto a fourth portion of the night vision sensor, wherein each of the first portion, the second portion, the third portion, and the fourth portion are circular and inscribed within the sensor area of the night vision sensor, wherein each of the first portion, the second portion, the third portion, and the fourth portion are tangentially touching two of the first portion, the second portion, the third portion, and the fourth portion;
a second night vision sensor; and
a second objective lens assembly, the second night vision sensor communicatively coupled to the at least one processor, the second objective lens assembly comprising a fifth lens having an infrared filter, the fifth lens configured to project the real world scene onto the second night vision sensor, wherein the second night vision sensor is configured to provide a greyscale image of the real world scene from the second objective lens assembly to the at least one processor;
wherein the first lens has one of a red, green, or blue first filter;
wherein the second lens has one of a red, green, or blue second filter different from that of the first filter;
wherein the third lens has one of a red, green, blue, or infrared third filter different from that of the first filter and of the second filter;
wherein the fourth lens is unfiltered or has one of a red, green, blue, or infrared fourth filter different from that of the first filter, of the second filter, and of the third filter;
wherein the night vision sensor is configured to provide at least four images of the real world scene from the objective lens assembly to the at least one processor, the at least four images including the first color image, the second color image, the third image, and the fourth image;
wherein the at least one processor is configured to:
receive the first color image, the second color image, the third image, and the fourth image from the night vision sensor and the greyscale image from the second night vision sensor;
generate color night vision image data based at least on the first color image, the second color image, the third image, the fourth image, the greyscale image, and luminance data from the greyscale image to colorize the greyscale image; and
output the color night vision image data;
wherein the color night vision image data includes at least one of true color night vision image data, false color night vision image data, or pseudo-true-color night vision image data; and
wherein the at least one display is configured to display images corresponding to the color night vision image data.

2. The system of claim 1, wherein the first lens has the red first filter, the second lens has the green second filter, and the third lens has the blue third filter.

3. The system of claim 2, wherein the fourth lens is unfiltered.

4. The system of claim 2, wherein the fourth lens has the red, green, or blue fourth filter.

5. The system of claim 2, wherein the fourth lens has the infrared fourth filter.

6. The system of claim 1, wherein the third lens has the infrared third filter, and wherein the fourth lens has the infrared fourth filter.

7. The system of claim 1, wherein the generated color night vision image data includes the true color night vision image data.

8. The system of claim 1, wherein the generated color night vision image data includes at least one of the false color night vision image data or the pseudo-true-color night vision image data.

9. The system of claim 1, wherein the at least one processor is further configured to:
perform a gamma correction on at least one of the first color image, the second color image, the third image, or the fourth image.

10. The system of claim 1, wherein the at least one processor is further configured to:
for each of the first color image, the second color image, the third image, and the fourth image that is a color image, boost each color image on a pixel by pixel basis based at least on nearest neighbor pixel data from at least one of the first color image, the second color image, the third image, and the fourth image that is an infrared-filter-formed image;
extract infrared pixels with no nearest neighbor color pixels; and
perform a gamma correction on each color image.

11. The system of claim 1, wherein each of the first color image, the second color image, the third image, and the fourth image are opto-mechanically misaligned by a half-pixel from another of the first color image, the second color image, the third image, and the fourth image, wherein the at least one processor is further configured to:
perform a gamma correction on at least one of the first color image, the second color image, the third image, or the fourth image; and
perform super-resolution processing on the first color image, the second color image, the third image, and the fourth image to boost native resolution of each of the first color image, the second color image, the third image, and the fourth image.

12. The system of claim 1, wherein at least one of the third lens and fourth lens has an infrared filter, wherein each of the first color image, the second color image, the third image, and the fourth image are opto-mechanically misaligned by a half-pixel from another of the first color image, the second color image, the third image, and the fourth image, wherein the at least one processor is further configured to:
for each of the first color image, the second color image, the third image, and the fourth image that is a color image, boost each color image on a pixel by pixel basis based at least on nearest neighbor pixel data from at least one of the first color image, the second color image, the third image, and the fourth image that is an infrared-filter-formed image;
perform a gamma correction on each color image; and
perform super resolution processing on the first color image, the second color image, the third image, and the fourth image to boost native resolution of each of the first color image, the second color image, the third image, and the fourth image.

13. A method, comprising:
projecting, by a first lens of an objective lens assembly, a first color image of a real world scene onto a first portion of a night vision sensor, the objective lens assembly comprising four lenses, wherein a head wearable device comprises at least one processor, the night vision sensor, the objective lens assembly, and at least one display, wherein the first lens has one of a red, green, or blue first filter;
projecting, by a second lens of the objective lens assembly, a second color image of the real world scene onto a second portion of the night vision sensor, wherein the second lens has one of a red, green, or blue second filter different from that of the first filter;

projecting, by a third lens of the objective lens assembly, a third image of the real world scene onto a third portion of the night vision sensor, wherein the third lens has one of a red, green, blue, or infrared third filter different from that of the first filter and of the second filter;

projecting, by a fourth lens of the objective lens assembly, a fourth image of the real world scene onto a fourth portion of the night vision sensor, wherein the fourth lens is unfiltered or has one of a red, green, blue, or infrared fourth filter different from that of the first filter, of the second filter, and of the third filter, wherein the night vision sensor has a sensor area, wherein each of the first portion, the second portion, the third portion, and the fourth portion are circular and inscribed within the sensor area of the night vision sensor, wherein each of the first portion, the second portion, the third portion, and the fourth portion are tangentially touching two of the first portion, the second portion, the third portion, and the fourth portion;

providing, by the night vision sensor, at least four images of the real world scene from the objective lens assembly to the at least one processor, the first color image, the second color image, the third image, and the fourth image, the night vision sensor communicatively coupled to the at least one processor;

projecting, by a fifth lens of a second objective lens assembly, the real world scene onto a second night vision sensor, the second night vision sensor communicatively coupled to the at least one processor, the fifth lens having an infrared filter;

providing, by the second night vision sensor, a greyscale image of the real world scene from the second objective lens assembly to the at least one processor;

receiving, by the at least one processor, the first color image, the second color image, the third image, and the fourth image from the night vision sensor and the greyscale image from the second night vision sensor;

generating, by the at least one processor, the color night vision image data based at least on the first color image, the second color image, the third image, the fourth image, the greyscale image and luminance data from the greyscale image to colorize the greyscale image;

outputting, by the at least one processor, the color night vision image data; and displaying, by the at least one display, images corresponding to the color night vision image data;

wherein the color night vision image data includes at least one of true color night vision image data, false color night vision image data, or pseudo-true-color night vision image data.

14. The system of claim 1, wherein the generated color night vision image data includes the true color night vision image data, the false color night vision image data, and the pseudo-true-color night vision image data.

15. The system of claim 10, wherein the at least one display is configured to display the color night vision image data, wherein the generated color night vision image data includes the true color night vision image data.

16. The system of claim 11, wherein the at least one display is configured to display the color night vision image data, wherein the generated color night vision image data includes the true color night vision image data.

17. The system of claim 11, wherein the at least one display is configured to display the color night vision image data, wherein the generated color night vision image data includes the true color night vision image data.

18. The system of claim 1, wherein the greyscale image has a higher resolution than each of the first color image, the second color image, the third image, and the fourth image.

* * * * *